United States Patent Office 3,298,240
Patented Jan. 17, 1967

---

3,298,240
FLOATING PINION FOR REDUCTION GEARS
Charles H. McDowell, Southampton, and Alexander M. Mark, Philadelphia, Pa., assignors to the United States of America as represented by the Secretary of the Navy
Filed Dec. 28, 1964, Ser. No. 421,737
7 Claims. (Cl. 74—411)

The invention described herein may be manufactured and used by or for the Government of the United States of America for governmental purposes without the payment of any royalties thereon or therefor.

This invention relates to vibration dampening and is particularly concerned with the reduction or minimization of noise resulting from concentric rotating shaft assemblies such as those mounting reduction gears.

In general, reduction gears are rigidly mounted on shafts, and in most instances the pinion is machined as part of a shaft. Noise generated by reduction gears may arise both from unavoidable errors in geometry and from errors in action as elastic deflections of teeth and mating elements occur when transmitting load. Torsional excitations resulting from such gear errors could induce violent vibrations in geared shaft systems, and the effect of such instabilities depends essentially on the magnitude and frequency of the gear errors and the elastic and damping characteristics of the system. Current practice to reduce gear noise is by the use of fine pitch and high helix angle gear design. The principal disadvantages of this approach are that, fine pitch and high helix angle gear design would mean an increase in size and weight of the unit, that fine pitch gears require longer manufacturing time resulting in increased cost and that fine pitch and high helix angle gears may experience dynamic gear errors from elastic deflection of the gear teeth during use.

An important object of the invention is to provide noise damping means for concentrically mounted members which is adaptable to meet various operational requirements.

Another object of the present invention to to provide an arrangement for the coupling of concentrically mounted members to provide simultaneous rotation with a minimum of noise from vibratory forces.

Another object of the invention is to provide an arrangement for the coupling of concentrically mounted reduction gear shafts in a manner to dampen vibrational noises.

For a better understanding of the invention, reference may be made to the accompanying drawings wherein.

Figure 1:
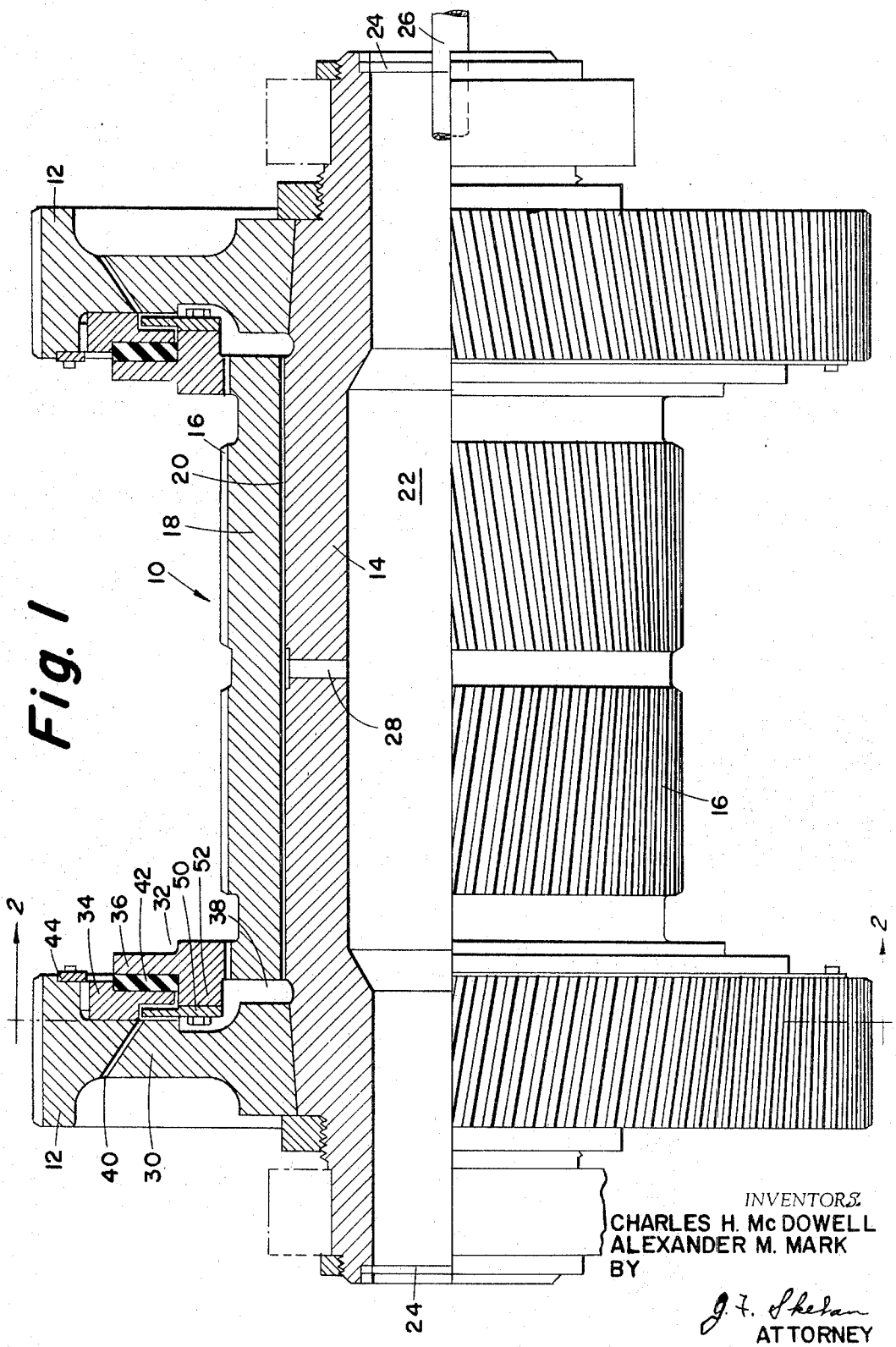
FIGURE 1 is an elevational view partly sectioned to show some details.

In the drawings, a plural reduction gear unit is indicated generally at 10 and is representative of a concentric shaft assembly with which the invention may be used. The unit consists of a pair of end gears and a pair of central gears all of which are represented in the lower portion of FIGURE 1 as having double helical type teeth. The end gears are similar and are indicated at 12—12 and are formed as integral parts of an inner shaft 14 that is mounted for rotation in end supports which are shown in phantom lines and unidentified. The central gears are similar and indicated at 16—16 and are an integral part of an outer shaft 18. The outer shaft 18 has a greater inner diameter than the outer diameter of the inner shaft 14 and is mounted concentrically with inner shaft 14 providing an annular fluid space 20 therewith.

The inner shaft 14 is formed into a closed chamber 22 by means of end plates 24—24 which are welded or otherwise secured to the shaft ends and the chamber provides a fluid reservoir for a viscous fluid which is supplied, for example, by a conduit 26. Fluid from the chamber 22 is transmitted to the annular space 20 by means of orifices 28, which are circumferentially spaced in the shaft 14 and during rotation of the shaft a hydrodynamic film is maintained in the annular space.

Since details of the gears and coupling structure at the left and right side of FIGURE 1 are similar, only that structure at the left side will be provided with identifying numerals. The end gears 12 are radially spaced from the central gears 12 by a web 30 and a coupling unit is provided which is conveniently located adjacent the web for interconnecting the shaft 14 through the web 30 with the shaft 18 in order to provide for simultaneous rotation. The coupling is generally indicated at 32 and is formed of a plurality of rings or ring-like members including an inner metal ring 34 which is splined to the web 30 and an outer metal ring 36 which is splined to the shaft 18. This arrangement provides an end space 38 which communicates with the annular space 20. An outlet passageway 40 may be provided in the web for fluid removal and this fluid may flow from chamber 22 into the annular space 20 and the shaft 18 will in effect float on the hydrodynamic film formed between the shafts.

The coupling 32 also has a resilient central ring indicated at 42 which is bonded to each of the metallic inner and outer rings 34 and 36 forming an integral coupling unit. The resilient ring 42 of the coupling unit provides a connection between the shaft 14 and sleeve 18 which is flexible, torsionally resilient and noise attenuating when torque is applied for simultaneously rotating the concentric members 14 and 18. The coupling unit 32 is secured by a retaining ring 44 which is connected to the web 30 by suitable bolt connections.

Figure 2:
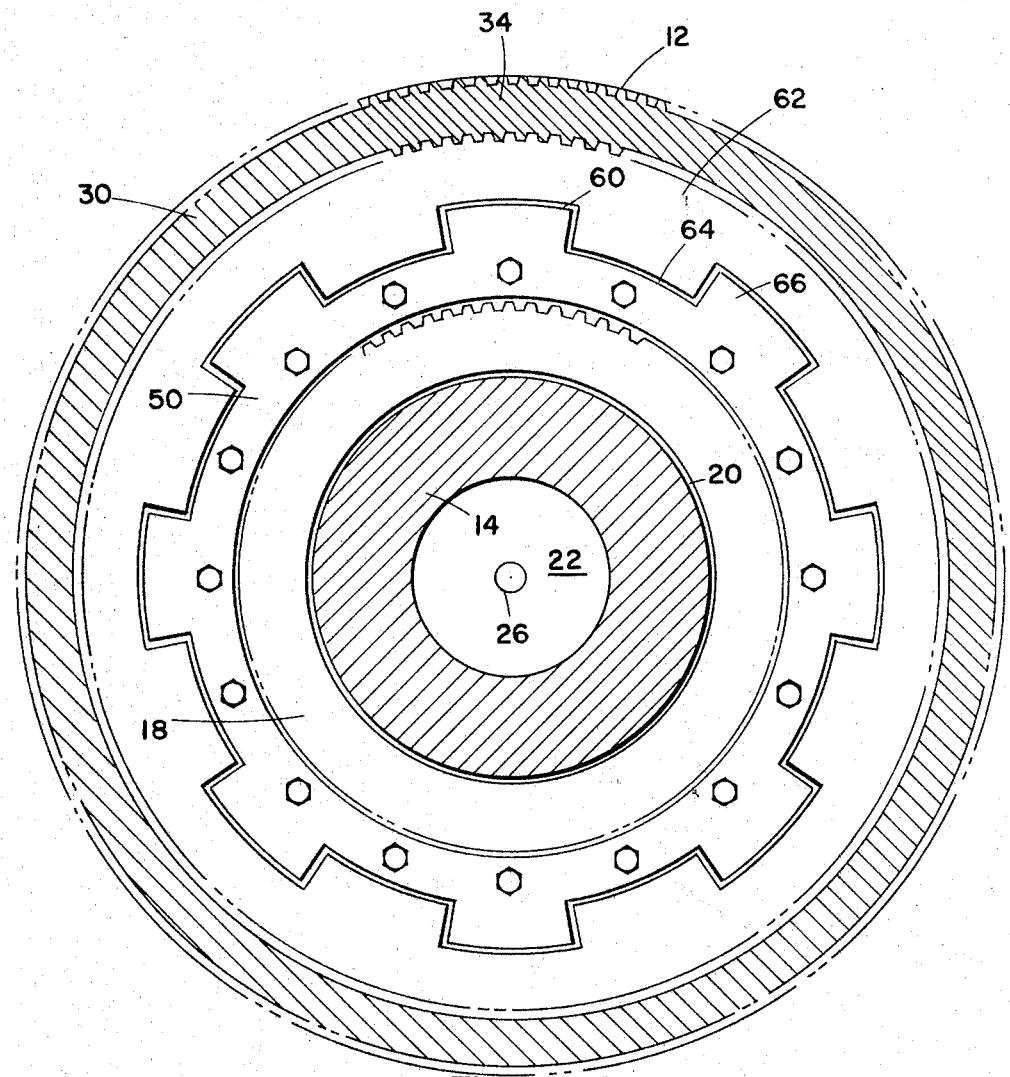
FIGURE 2 is a sectional view taken on the line 2—2 of FIGURE 1 to show other details.

The coupling unit 32 is also provided with an overload or dampening ring indicated at 50 which is secured by bolt connections to the outer metal ring 36 through an inwardly extending flange 52 and the overload ring 50 is joined to the inner ring 34 in a manner to permit some movement therebetween which is dampened or has a dash-pot effect by virtue of the viscous liquid in the end space 38. The manner of joining these members is by the provision in the inner ring 34 of a circumferential group of cavities 60 and a circumferential group of segments 62 which are arranged in alternation with the cavities 60. Similarly the overload ring 50 is provided with a group of cavities 64 which are arranged in alternation by a group of segments 66. As shown in FIGURE 2, the segments 66 of the dampening ring are received in the cavities 60 of the inner ring 34 while the segments 62 of the inner ring 34 are received in the cavities 64 of the dampening ring. The connections are in effect lapped joints. By making the segments of smaller dimensions than the cavities, as shown in the drawings, spaces are provided which permit relative movement between the rings 34 and 50. The cavities will receive viscous fluid from the end space 38 and provide a dash-pot effect to the movement between the rings. The dampened movement between the rings 34 and 50 will be in accordance with the degree of shearing of the resilient coupling ring 42, however, in the event of failure of the resilient ring 42, a positive drive is effected between the rings 34 and 50, and resultant movement of the shafts 14 and 18.

Obviously many modifications and variations of the present invention are possible in the light of the above teachings. It is therefore to be understood that, within the scope of the appended claims, the invention may be practiced otherwise than as specifically described.

We claim:
1. Vibration damper apparatus comprising,
(a) an inner shaft having a web extending radially therefrom and an outer annular shaft concentric with the inner shaft and having one end disposed adjacent said web,
(b) a coupling unit formed of a first metal ring and a second metal ring interconnected by a central resilient ring,
(c) said first metal ring being connected to the web of the inner shaft and said second metal ring being connected to said one end of the outer annular shaft,
(d) said outer annular shaft having a greater inner diameter than the outer diameter of the inner shaft providing an annular space therebetween,
(e) said one end of the outer annular shaft and the coupling structure providing an end space with the inner shaft which is in communication with said annular space and
(f) means for supplying a viscous fluid to one of the spaces to provide a hydrodynamic film between the shafts during their rotation.

2. Vibration damper apparatus comprising,
(a) an inner shaft having a web extending radially therefrom providing a first gear and an outer annular shaft concentric with the inner shaft providing a second gear and having one end disposed adjacent said web,
(b) a coupling unit formed of a first metal ring and a second metal ring interconnected by central resilient means,
(c) said first metal ring being connected to said web and said second metal ring being connected to said one end of the outer annular shaft,
(d) said outer annular shaft having a gerater inner diameter than the outer diameter of the inner shaft providing an annular space therebetween,
(e) said one end of the outer annular shaft and the coupling structure providing an end space with the inner shaft which is in communication with said annular space and
(f) means for supplying a viscous liquid to one of said spaces to provide a hydrodynamic film between the shafts during their rotation.

3. Vibration damper apparatus comprising,
(a) an inner shaft having a web extending radially therefrom terminating in a flange providing a first gear on the flange outer periphery and an outer annular shaft concentric with the inner shaft providing a second gear and having one end disposed adjacent said web,
(b) a coupling unit formed of a first metal ring and a second metal ring interconnected by a central resilient ring,
(c) said first metal ring having its outer periphery connected to the inner periphery of said web and said second metal ring being connected at its inner periphery with said one end of said outer annular shaft,
(d) said outer annular shaft having a greater inner diameter than the outer diameter of the inner shaft to provide an annular space therebetween,
(e) said one end of the outer annular shaft and the coupling structure providing an end space with the inner shaft which is in communication with said annular space and
(f) means for supplying a viscous liquid to one of said spaces to provide a hydrodynamic film between the shafts during their rotation.

4. Apparatus as in claim 1, further characterized by an overload metal ring interconnecting the first and second metal rings of the coupling whereby rotation of the shafts is effected upon failure of the coupling unit.

5. Apparatus as in claim 3, further characterized by said second metal ring of the coupling having a flange portion extending within said end space, an overload ring secured to said flange and having its outer peripheral edge overlapping the outer peripheral edge of the first metal ring of the coupling and said peripheral edges having connecting means therebetween.

6. Apparatus as in claim 5, further characterized by said connecting means comprising a group of cavities and a group of segments which are arranged in alternation in each ring and wherein the segments of one ring are received in the cavities of the other ring.

7. Apparatus as in claim 6, further characterized by the segments of the rings being received in the cavities in freely moving relation therewith permitting relative movement between the rings and providing a dampening effect when the cavities contain a viscous fluid.

References Cited by the Examiner

UNITED STATES PATENTS 2,691,283 10/1954 Stover _____ 64—27 X
2,879,418 3/1959 Ennis _____ 74—411 X

FOREIGN PATENTS 853,688 11/1960 Great Britain.

DAVID J. WILLIAMOWSKY, *Primary Examiner.*

L. H. GERIN, *Assistant Examiner.*